Patented Nov. 20, 1934

1,981,232

UNITED STATES PATENT OFFICE 1,981,232

PLASTICS

William A. Hamor and Werner W. Duecker, Pittsburgh, Pa., assignors to Texas Gulf Sulphur Company, Bay City, Tex., a corporation of Texas No Drawing. Application October 5, 1932, Serial No. 636,337

12 Claims. (Cl. 106—22)

This invention relates to plastics and has for an object the provision of an improved method for producing sulphur in a plastic state. The invention further contemplates the provision of novel sulphur products.

The present invention is based on our discovery that arsenic phosphorus, and thallium and compounds containing those elements are effective stabilizers of amorphous or non-crystalline sulphur and effectively retard or inhibit crystallization of plastic sulphur.

When elemental sulphur is heated to a temperature above about 200° C. and then rapidly chilled to a temperature below its melting-point, an amorphous, plastic sulphur product is formed. The product thus formed, however, is unstable and loses its plasticity and crystallizes within about twenty-four hours.

We have discovered that when arsenic, phosphorus or thallium or a substance containing one of those elements is dispersed in sulphur heated to the temperature indicated and the resulting product is cooled to a temperature below its melting-point, a relatively stable plastic sulphur product is formed.

According to a preferred process of our invention, elemental sulphur is heated with a suitable stabilizing agent to a temperature above 200° C. until the stabilizing agent has been dispersed throughout the molten sulphur to form a homogeneous fluid. The molten material may be stirred or otherwise agitated during the heating operation to aid dispersion or solution. The resulting fluid is then cooled rapidly to a temperature below its solidifying point, preferably by passing it in finely divided form into a cooling liquid. Any suitable method may be employed in subdividing the fluid mass to obtain small particles or threads which will facilitate cooling. Thus, for example, the fluid may be poured in a thin stream, or sprayed through nozzles or by means of a centrifuge, or the fluid may be passed over a perforated plate in a shot-tower arrangement.

For the purpose of cooling the fluid, we have employed successfully water at 0° C., +25° C., +60° C., and +100° C.; sulphuric acid, Sp. Gr. 1.84, at 0° C.; nitric acid, Sp. Gr. 1.42, at 0° C.; liquid nitrogen at —195° C.; and a mixture of solid carbon dioxide and acetone at —70° C.

Our researches indicate that, among others, the following factors are of importance in the production or stabilization of plastic sulphur:

(1) Type of stabilizing agent;
(2) Amount of stabilizing agent;
(3) Quenching temperature;
(4) Quenching fluid;
(5) Heating temperature; and
(6) Time of heating.

The sulphur should be heated with a suitable amount and type of stabilizing agent until a substantially homogeneous fluid has been formed.

The results of our tests indicate that water at temperatures from about 0° C. to about 60° C. is the most suitable quenching fluid. Products formed by quenching at a temperature of —195° C. and above +60° C. and by quenching in sulphuric acid and nitric acid at 0° C. lose their plasticity more rapidly than products quenched at intermediate temperatures and in water at temperatures of about 0° C. to 60° C. Quenching temperatures ranging from —70° C. to +60° C. appear to be most suitable for the production of plastic sulphur.

The time of heating the sulphur with the stabilizing agent is determined by the time required for dispersing or dissolving the stabilizing agent. In general, when the temperature is sufficiently high to initiate dispersion or solution, a ten-minute heating period is sufficient.

Some of the data obtained in testing various stabilizing agents at different heating temperatures indicate that similar quantities of certain agents are equally effective at all heating temperatures while other data indicate that with respect to other agents larger quantities must be employed at lower temperatures. Thus, for example, similar quantities of arsenic disulphide ($As_2S_2$), arsenic trisulphide ($As_2S_3$), and phosphorus trisulphide ($P_2S_3$) are equally effective at temperatures of 200° C., 300° C. and 440° C., while the quantity of phosphorus pentasulphide ($P_2S_5$) is inversely proportional to the heating temperature, about 23% being required to produce at 200° C. and 300° C. results equal to the results produced by about 10% to 14% at 440° C.

The following tables show some of the amounts of arsenic and phosphorus and compounds of arsenic and phosphorus which are effective in stabilizing plastic sulphur when incorporated in elemental sulphur at various temperatures (the percentages given define the proportions by weight of the stabilizing agents in the plastic sulphur products):

Table I

| Heating temperature | Elemental phosphorus (P) | Phosphorus trisulphide ($P_2S_3$) | Phosphorus pentasulphide ($P_2S_5$) |
|---|---|---|---|
| | Percent | Percent | Percent |
| 200° C | | 10 | 23.07 |
| 300° C | | 10 | 23.07 |
| 440° C | 2.91 to 4.76 | 2.31 to 8.25 | 8.25 to 13. 8 |

Table II

| Heating temperature | Arsenic (As) | Arsenic disulphide ($As_2S_2$) | Arsenic trisulphide ($As_2S_3$) | Arsenic trioxide ($As_2O_3$) |
|---|---|---|---|---|
| | Percent | Percent | Percent | Percent |
| 200° C | | | 10 | |
| 300° C | 10 | 10 | 10 | |
| 440° C | 13.05 | 10 to 17.35 | 10 to 16.66 | 9.9 to 11.5 |

Thallium and its compounds appear to be effective stabilizers of plastic sulphur, but the results obtained thus far indicate that excessive amounts, varying from 10% to 40%, are required.

For the stabilization of plastic sulphur with elemental phosphorus, it is advisable to employ red phosphorus, as yellow phosphorus reacts with sulphur with explosive violence.

All proportions of phosphorus, arsenic, and thallium-bearing substances tested were effective in retarding or inhibiting crystallization of sulphur. In every instance an amorphous product was formed, and in practically every instance the product was plastic initially and for at least one week after its production. The amounts of phosphorus, arsenic, and compounds of phosphorus and arsenic set forth in Tables I and II have been employed to form products which remain plastic at least for several months; and some of which, at least, appear to have been rendered permanently plastic.

All of the plastic products become slightly harder with age at normal room temperatures. Some of the initially plastic products harden gradually for several weeks and ultimately approach a stable plastic state. Other products harden gradually until they reach a stable vitreous state. The vitrifying process is slow at ordinary room temperatures, but it can be accelerated by subjecting the plastic product to the effects of higher temperatures, particularly temperatures above 60° C. Thus, for example, freshly prepared plastic sulphur can be completely vitrified by maintaining it at a temperature of 70° C. for sixteen hours. The resulting vitreous product shows no crystalline structure; it is a dense, even mass possessing a fracture resembling that of glass, and it appears to be stable.

Plastic and vitreous sulphur products soften or melt at approximately 120° C. At temperatures of from 120° C. to the boiling-point, these forms of sulphur are exceedingly viscous. Both forms of sulphur are soluble in the "Aroclors" (chlorinated diphenyls).

Plastic sulphur can be heated to temperatures above its melting-point and cooled gradually to room temperature without destroying its plasticity.

We claim:—

1. The method of producing plastic sulphur which comprises heating a mixture of elemental sulphur and an arsenic sulphide to a temperature above 200° C., and rapidly cooling the resulting fluid to a temperature below the melting point of sulphur, the amount of arsenic sulphide employed being equal to about 10% of the weight of the mixture.

2. The method of producing plastic sulphur which comprises heating a mixture of elemental sulphur and an arsenic sulphide to a temperature above 300° C., and rapidly cooling the resulting fluid to a temperature below the melting point of sulphur, the amount of arsenic sulphide employed being equal to about 10% of the weight of the mixture.

3. The method of producing plastic sulphur which comprises heating a mixture of elemental sulphur and elemental arsenic to a temperature above 300° C., and rapidly cooling the resulting fluid to a temperature below the melting point of sulphur, the amount of elemental arsenic employed being equal to about 10% of the weight of the mixture.

4. The method of producing plastic sulphur which comprises heating a mixture of elemental sulphur and elemental arsenic to a temperature of about 440° C., and rapidly cooling the resulting fluid to a temperature below the melting point of sulphur, the amount of elemental arsenic employed being equal to about 13% of the weight of the mixture.

5. The method of producing plastic sulphur which comprises heating a mixture of elemental sulphur and an arsenic sulphide to a temperature of about 200° C. to 440° C., and rapidly cooling the resulting fluid to a temperature below the melting point of sulphur, the amount of arsenic sulphide employed being equal to about 10% to 17.35% of the weight of the mixture.

6. The method of producing plastic sulphur which comprises heating a mixture of elemental sulphur and an arsenic oxide to a temperature of about 440° C., and rapidly cooling the resulting fluid to a temperature below the melting point of sulphur, the amount of arsenic oxide employed being equal to about 9.9% to 11.5% of the weight of the mixture.

7. The method of producing plastic sulphur which comprises heating a mixture of elemental sulphur and an arsenic sulphide to a temperature above 200° C., and rapidly cooling the resulting fluid to a temperature of about 0° C. to 60° C., the amount of arsenic sulphide employed being equal to about 10% of the weight of the mixture.

8. The method of producing plastic sulphur which comprises heating a mixture of elemental sulphur and an arsenic sulphide to a temperature above 300° C., and rapidly cooling the resulting fluid to a temperature of about 0° C. to 60° C., the amount of arsenic sulphide employed being equal to about 10% of the weight of the mixture.

9. The method of producing plastic sulphur which comprises heating a mixture of elemental sulphur and elemental arsenic to a temperature above 300° C., and rapidly cooling the resulting fluid to a temperature of about 0° C. to 60° C., the amount of elemental arsenic employed being equal to about 10% of the weight of the mixture.

10. The method of producing plastic sulphur which comprises heating a mixture of elemental sulphur and elemental arsenic to a temperature of about 440° C., and rapidly cooling the resulting fluid to a temperature of about 0° C. to 60° C., the amount of elemental arsenic employed being equal to about 13% of the weight of the mixture.

11. The method of producing plastic sulphur which comprises heating a mixture of elemental sulphur and an arsenic sulphide to a temperature of about 200° C. to 440° C., and rapidly cooling the resulting fluid to a temperature of about 0° C. to 60° C., the amount of arsenic sulphide employed being equal to about 10% to 17.35% of the weight of the mixture.

12. The method of producing plastic sulphur which comprises heating a mixture of elemental sulphur and an arsenic oxide to a temperature of about 440° C., and rapidly cooling the resulting fluid to a temperature of about 0° C. to 60° C., the amount of arsenic oxide employed being equal to about 9.9% to 11.5% of the weight of the mixture.

WILLIAM A. HAMOR.
WERNER W. DUECKER.